United States Patent [19]

Forkner

[11] 4,171,380

[45] Oct. 16, 1979

[54] COOKED DOUGH ENVELOPE HAVING FROZEN FILLING AND METHOD THEREFOR

[76] Inventor: John H. Forkner, 2116 Mayfair Dr., Fresno, Calif. 93703

[21] Appl. No.: 896,711

[22] Filed: Apr. 17, 1978

[51] Int. Cl.² .................. A21D 13/08; A23G 9/04
[52] U.S. Cl. .................. 426/95; 426/565; 426/439; 426/496; 426/502
[58] Field of Search .......... 426/94, 95, 566, 101, 426/439, 440, 524, 496, 502

[56] References Cited

U.S. PATENT DOCUMENTS

| | | | |
|---|---|---|---|
| 1,445,187 | 2/1923 | Vaughan | 426/95 |
| 1,511,878 | 10/1924 | Gargay | 426/95 |
| 2,092,160 | 7/1937 | Hawerlander | 426/94 |
| 2,404,177 | 7/1946 | Jetschmann | 426/95 |
| 2,668,117 | 2/1954 | Bucci | 426/21 |
| 2,998,318 | 8/1961 | Forkner | 426/95 |
| 3,366,485 | 1/1968 | Hopkins | 426/101 |
| 3,911,155 | 10/1975 | Ferrero | 426/94 |
| 4,020,188 | 4/1977 | Forkner | 426/95 |

*Primary Examiner*—Jeanette M. Hunter
*Attorney, Agent, or Firm*—Flehr, Hohbach, Test, Albritton & Herbert

[57] ABSTRACT

An improved cooked dough envelope having a protective backing layer and a frozen dessert filling wherein the improvement resides in having the backing layer confined to the inner side of the dough layer facing the filling only and having the margins of the outer dough layer overlapped and sealed.

16 Claims, 20 Drawing Figures

FIG.—20

COOKED DOUGH ENVELOPE HAVING FROZEN FILLING AND METHOD THEREFOR

BACKGROUND OF THE INVENTION

This invention relates generally to food products of the type consisting of an inner filler enveloped within an outer edible envelope, and methods for the manufacture of such products.

In my U.S. Pat. No. 4,020,188 there is disclosed a food product consisting of a mass of frozen dessert contained within an envelope consisting of cooked dough and a protective backing layer between the outer dough and the filling. The method of manufacture involves enveloping the mass of frozen dessert in laminated sheets consisting of uncooked dough having a layer of backing material applied to one side of the same. Upon applying such a composite sheet or sheets about the frozen filling, seals or seams are formed between the overlapping edge portions of the composite sheets, with portions of the backing layer interposed between overlapping portions of uncooked dough, and this assembly, preferably after rechilling, is subjected to a cooking cycle. When the cooking cycle involves deep fat frying, or in other words, immersion of the product in hot oil or fat at a temperature of the order of 400° F., the seals tend to open, thus exposing surfaces of the frozen dessert and portions of the backing to the hot oil, with the result that there is some melting of the frozen dessert, contamination of the frying oil, and some burning and deforming of the product. This is objectionable, particularly when deep fat frying is carried out in commercial establishments on a substantial scale, as for example, in an automated manner with products being continually supplied and removed from the oil. Such exudation of filling material deteriorates the fat by creating burned solid particles that are dispersed in the fat and which adhere to the surfaces of succeeding products to produce an unattractive speckled appearance. Contamination by leaking of filling material makes it necessary to renew the oil to prevent the development of burnt or other off-flavor and darkening of the color.

When the backing layer is interposed between overlapping margins of the uncooked dough, as described above, the dough margins forming a seam tend to flake away, and this tendency increases as the thickness of the uncooked dough is decreased.

SUMMARY OF THE INVENTION AND OBJECTS

It is an object of the present invention to provide an edible food product and method of manufacture which is an improvement over the product and method disclosed in my above-mentioned U.S. Pat. No. 4,020,188.

More particularly, it is an object of the invention to provide a food product consisting of an inner filler within an envelope of cooked dough, which is characterized by more effective seams between overlapping margins of the envelope.

Another object of the invention is to provide an improved method for manufacturing products of the type having an inner filler enveloped within an envelope consisting of a layer of dough having a layer of protective backing material interposed between the dough layer and the filling, and in which overlap seams are formed between margins of the dough layer which effectively resist opening when the product is subjected to deep fat frying.

Another object is to provide an improved method for the manufacture of food products in which a filling is enclosed within a dough envelope, the envelope consisting of a relatively thin outer dough layer together with a backing layer on the inner surface of the same which is interposed between the dough layer and the filling, but is not present in the seams, the backing layer preferably having a thickness substantially greater than that of the dough layer. The thickness of the dough layer is selected to be such that the cooking cycle for the product is greatly shortened. The absence of backing material between the overlapping margins provides seams which remain relatively intact during deep fat frying and are not subject to flaking away of the dough during cooking.

In general, the present invention is an edible food product comprising a filling disposed within an edible envelope. The envelope consists of an external layer of dough which initially is uncooked, and a protective layer interposed between the dough layer and the filling. The envelope is sealed by overlapping margins of the dough layer, and the backing layer is confined to the inner surface of the dough layer which is faced toward the filling. The backing layer forms a thermal barrier to minimize conduction of heat to the filling when the product is submitted to cooking as by deep fat frying. The invention also includes a method for manufacturing the product which is characterized by applying a layer of the backing material to one side of the dough sheet, leaving margins of the dough sheet extending beyond the perimeter of the backing layer. The filler is enclosed within the dough sheet with the backing layer interposed between the filling and the layer of dough, and with margins of the dough layer overlapping. Pressing of the overlapping margins directly together serves to form seals for the envelope. The backing layer is applied to the dough sheet in such a manner that its perimeter does not extend between the overlapping margins. Preferably the dough layer is relatively thin compared to the backing layer. The invention is particularly applicable to products having a frozen dessert filling.

Additional objects and features of the invention will appear from the following description in which the preferred embodiments have been set forth in detail in conjunction with the accompanying drawings.

DESCRIPTION OF THE PREFERRED EMBODIMENTS

Figure 1:
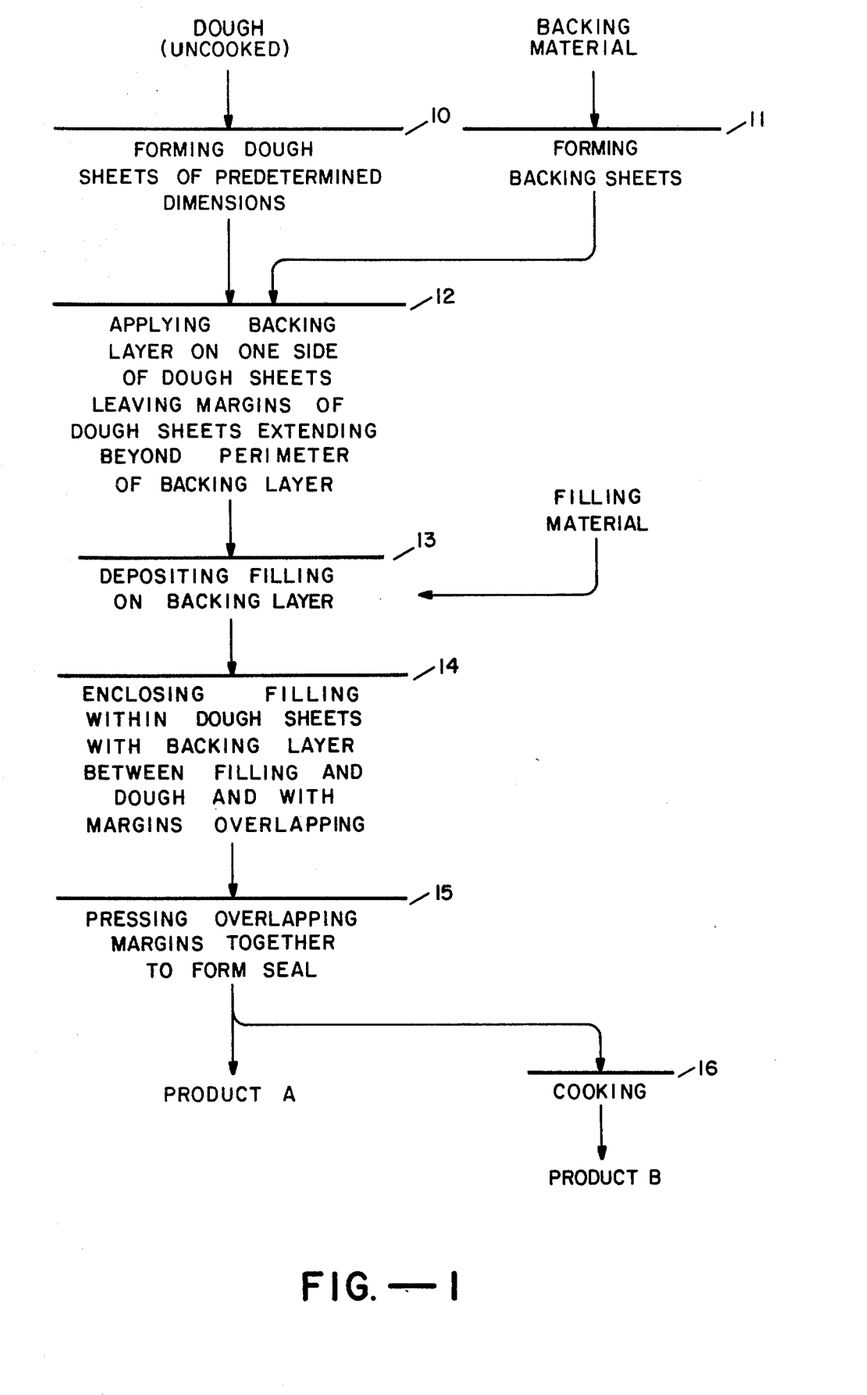
FIG. 1 is a flow diagram illustrating one procedure for carrying out the invention.

The method of manufacture outlined in FIG. 1 consists of sheeting dough to predetermined dimensions in step 10. The type of dough employed can be selected in accordance with the final product desired. However, in general it is desirable to use dough of the pastry type which includes cereal flour, sweeting and shortening. The sheeting is carried out to provide relatively thin dough sheets of predetermined thickness, as for example, about 1/64 to 1/16 inch thick. The dough as sheeted in step 10 is uncooked, as distinguished from the backing material employed. Step 11 represents the sheeting of backing material made from a sheetable plastic plaste, and this is likewise carried out to provide sheets of predetermined thickness, as for example, a thickness of 1/16 to ⅛ inch. The backing material has a moisture content substantially less than that of the uncooked dough or the filling material. It is assumed that in preparing the sheets in steps 10 and 11 they are trimmed to predetermined perimeter configuration and dimensions, again depending upon the character of the product to be manufactured. Perimeter dimensions of the backing sheets produced in step 11 should be less than the sheets produced in step 10, although the two sheets should have comparable configurations. In other words, the two sheets may be rectangular, square, circular, oval and the like.

In step 12 a sheet of backing material is applied on one side of each dough sheet, leaving margins of the dough sheet extending beyond the perimeter of the backing layer by virtue of the differences in dimensions. The two layers can be caused to shape and adhere together by further sheeting of the composite assembly or by sheeting together to the desired dimensions.

In step 13 a filler is deposited on the backing layer of a composite sheet. As presently described in greater detail, a wide variety of filling materials can be used, including fruit and berry fillings such as are commonly used in the manufacture of turnovers and pies. Also as will be presently explained, the filling may be a frozen dessert such as ice cream, frozen yogurt or custard.

In step 14 the filling is enclosed within two such dough sheets, with the backing layer of each sheet being interposed between the filling and the dough layer. The protruding margins of the dough layer which are not covered by the backing layer are brought into direct overlapping relation.

In step 15 the overlapping margins of the outer dough sheet are pressed together to cause them to adhere and form seals for the envelope. Such a product is indicated as Product A and is marketable as a refrigerated or frozen product. Either before or after the storage of Product A under refrigeration or in frozen condition, it can be submitted to cooking in step 16, as by immersion in hot fat, to produce the Product B which is in condition to be consumed. In some instances Product B may likewise be stored under refrigeration or as a frozen product, and thereafter prepared for eating by baking or by warming in an oven. Also in some instances such a frozen product can be prepared for eating by subjecting it to microwave heating to soften or melt the frozen filling.

The material used for the backing layer should be such that it functions as a thermal barrier whereby during a cooking cycle in which the product may be immersed in hot fat, insufficient heat penetrates through the backing layer to cause any material chemical or physical change in the filling. Also the backing layer facilitates cooking the outer dough layer, since it isolates the outer layer from direct contact with the filling. In addition it minimizes moisture migration from the filling to the outer dough layer during storage. One kind of backing material can be prepared by baking the same dough used in step 10 and then subdividing the baked crisp material with addition of sufficient water, fat, sugar, dairy products or other agent to form a dough-like paste. Other types of backing material can be used, as will be presently explained.

Figure 2:
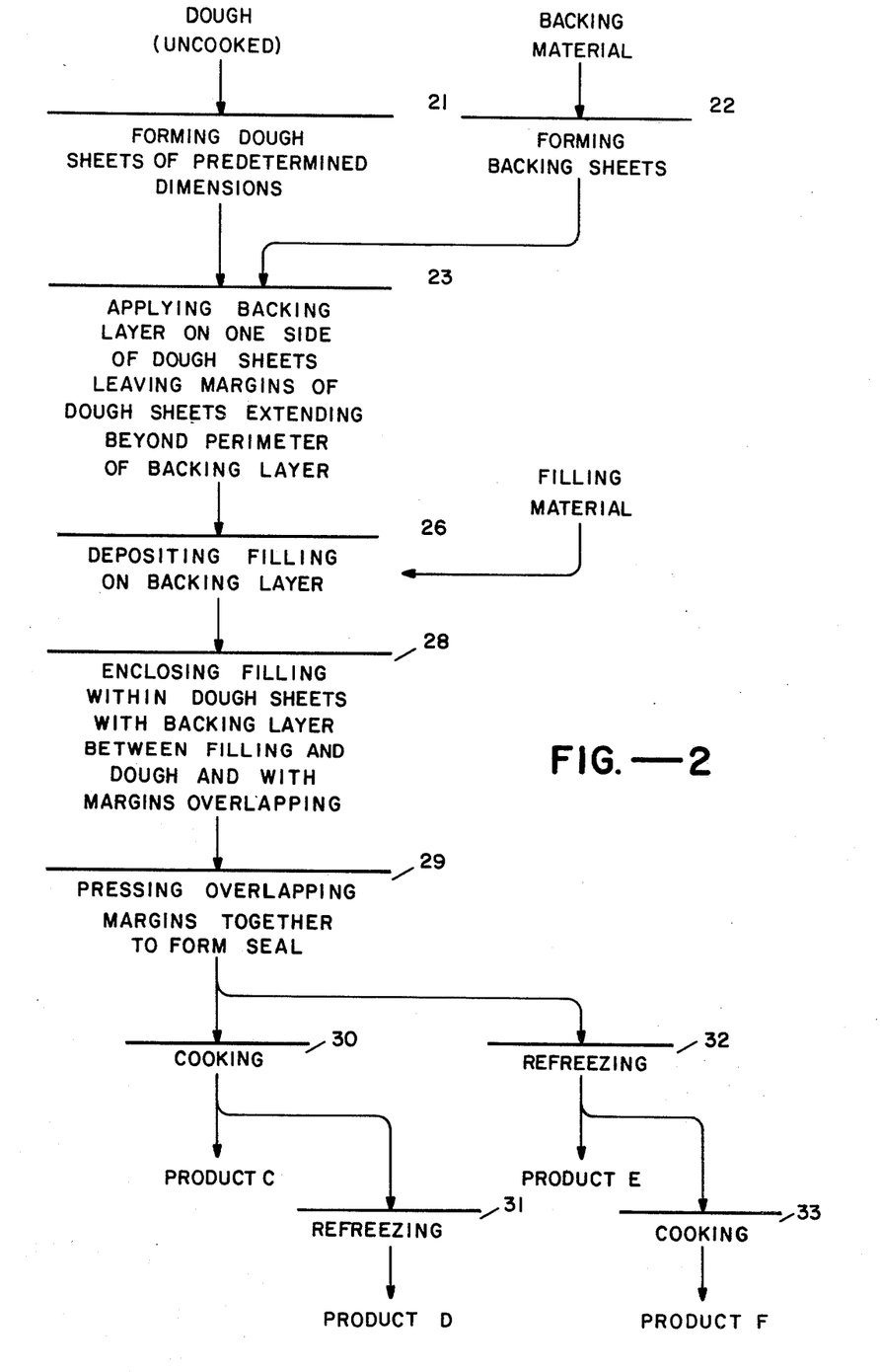
FIG. 2 is another flow diagram illustrating a modified procedure for carrying out the invention.

The method outlined in FIG. 2 makes use of frozen dessert as a filling. Steps 21, 22 and 23 of FIG. 2 are the same as steps 10, 11 and 12 of FIG. 1. Step 26 is the same as step 14 of FIG. 1, except that the filling is a frozen dessert. The frozen dessert may be a relatively hard mass of the desired size, or it may be semi-frozen and of pumpable consistency, such as soft ice cream. Step 28 involving enclosing the filling within the envelope formed by the dough sheets is the same as step 14 of FIG. 1. Also step 29 involving pressing of the overlapping margins of the dough sheet together to form a seal is the same as step 15 of FIG. 1. Assuming that the product produced by step 29 consists of semi-frozen material, the product before further processing is chilled to a temperature well below freezing, as for example, 20° F. or colder, to harden the filling. Assuming that the filling has been chilled to a temperature well below freezing (e.g., 0° F. to –40° F.), the product can be subjected to a cooking cycle 30 for the purpose of cooking the outer previously uncooked dough layer. This serves to produce Product C which can be immediately eaten. Cooking in this instance is preferably carried out by immersion of the product in hot oil or fat at a temperature of the order of 400° F. Assuming that the dough layer is relatively thin, as for example, of the order of ⅛ to 1/32 inch thick, the cooking cycle at the time of immersion in the hot fat should be relatively short, as for example, of the order of 5 to 30 seconds. Such a short cooking cycle reduces the amount of heat which may be transferred during the cycle through the inner backing layer to the outer surface areas of the frozen dessert, thus minimizing matting of the filling. In addition, it facilitates quantity commercial manufacture of the product.

Various known methods can be used to promote rapid browning, such as inclusion of ingredients like milk solids or corn sugar. Also the outer dough can be formulated to promote structural strength, as for example by using high protein cereal flour.

As indicated in FIG. 2, the Product C may be subjected to refreezing or rechilling in step 31, and thereafter stored in frozen condition as product D. Assuming that Product D is marketed as a frozen product, a consumer may subject it to a brief warming cycle before eating. FIG. 2 also indicates refreezing in step 32, following step 29, to produce Product E. Also this Product E is shown being subjected to a cooking cycle to produce the Product F.

Figure 3:
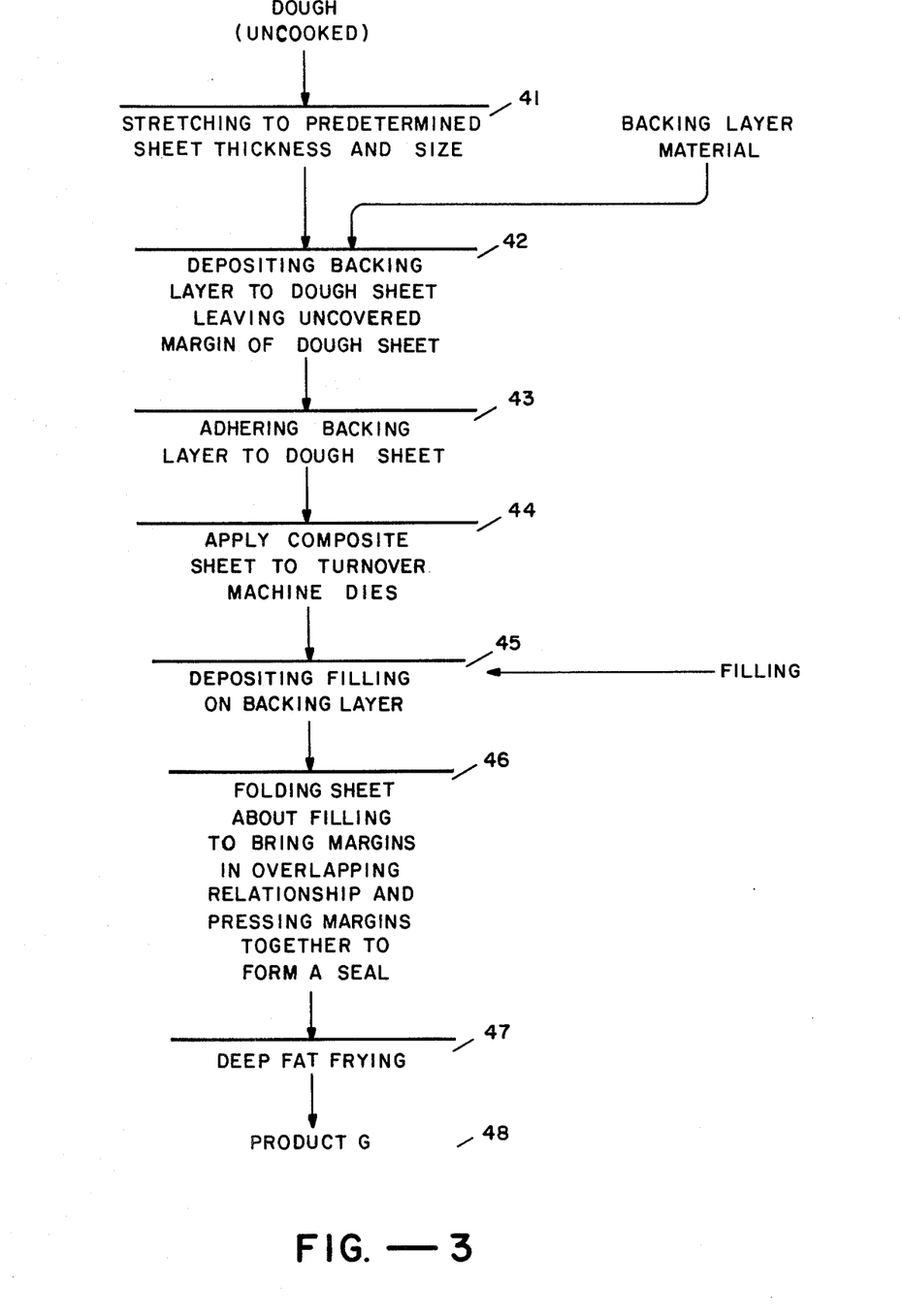
FIG. 3 is a flow diagram illustrating another embodiment of the method.

The method of FIG. 3 is for producing products of the turnover type. Here again the dough which is used for the outer layer is subjected to sheeting 41 to produce sheets of predetermined configuration and size. In FIG. 2 a sheet of backing layer material is applied to each of the dough sheets, leaving uncovered a projected margin of the dough sheet. The backing layer is caused to adhere to the dough layer in step 43, as by further sheeting, and the sheet is then supplied to the dies of a turnover machine. As is well known to those familiar with conventional turnover machines and methods, such machines may use dies of the roll type, or they may employ dies made in two parts that are hinged together as shown for example in Zones U.S. Pat. No. 3,230,901. In step 45 the filling is deposited on the upwardly faced backing layer, and thereafter in step 46 the sheet is folded over about the filling to bring the margins in overlapping relationship, with these margins being pressed together to cause them to adhere, and with excess material of the seal being trimmed away. This product can be subjected to deep fat frying 47 to produce the Product G. The filling used in the method of FIG. 3 may be of the unfrozen type previously mentioned, or may be a frozen dessert as referred to in connection with FIG. 2. While unfrozen filling may be at ambient temperature, it may be desirable with certain types of filling to reduce the temperature below ambient by refrigeration, thereby providing further thermal protection for the filling during the deep fat frying step 47.

Figure 4:
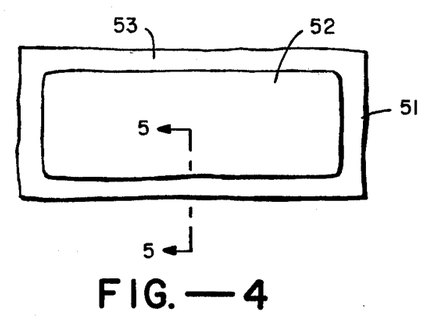
FIG. 4 is a plan view illustrating one step of the method.
Figure 5:
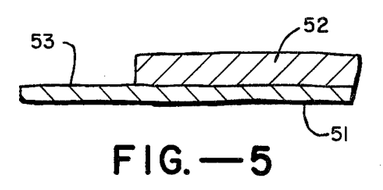
FIG. 5 is an enlarged section taken along the line 5—5 of FIG. 4.
Figure 6:
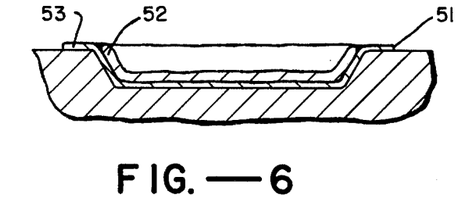
FIG. 6 is a schematic view illustrating another step in the method.
Figure 7:
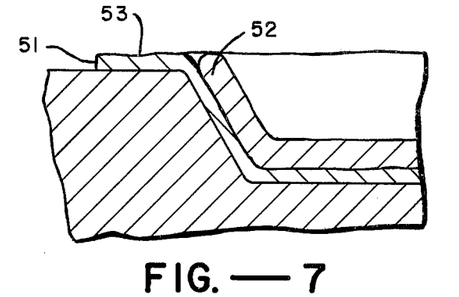
FIG. 7 is a schematic view in section on an enlarged scale illustrating the positioning of the dough layer and the inner backing for the step of the method shown in FIG. 6.
Figure 8:
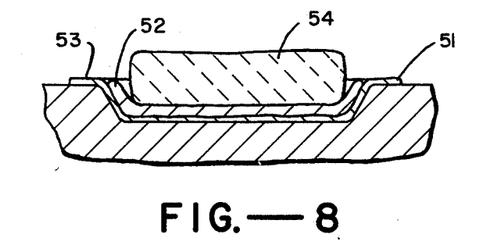
FIG. 8 is a schematic view in section illustrating the dough and backing layers and a portion of the filling.
Figure 9:
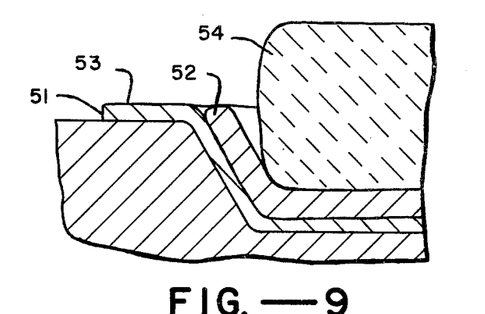
FIG. 9 is an enlarged detail in section illustrating the dough and backing layers and a portion of the filling.
Figure 10:
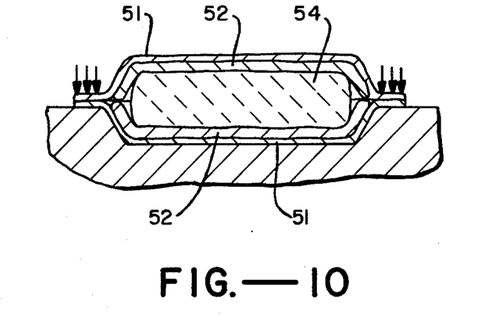
FIG. 10 is a schematic view illustrating another step in the method.
Figure 11:
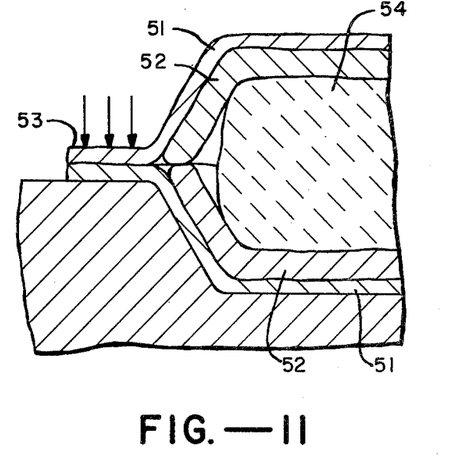
FIG. 11 is an enlarged detail in section showing the manner in which a seal is formed between the overlapping margins.
Figure 12:
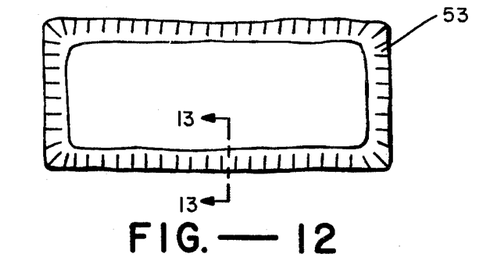
FIG. 12 is a plan view of a completed product.
Figure 13:
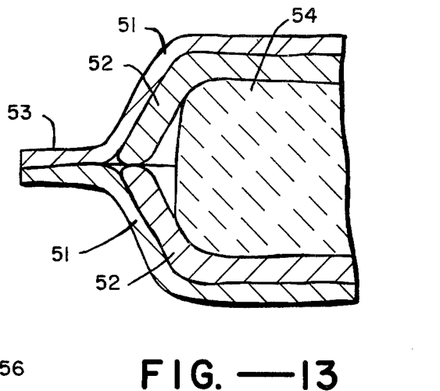
FIG. 13 is an enlarged detail in section taken along the line 13—13 of FIG. 12.
Figure 14:
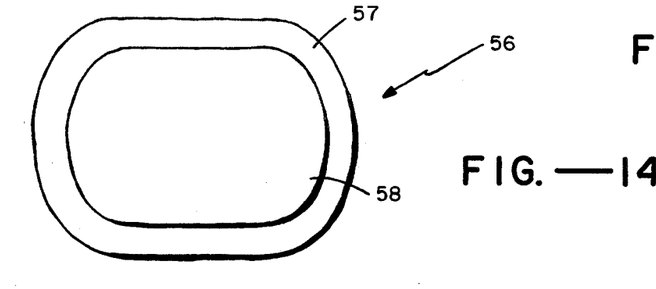
FIG. 14 is a plan view of a dough sheet with backing applied to the same prepared for making products of the turnover type.

FIGS. 4-13 schematically illustrate some of the steps shown in FIG. 1. FIGS. 4 and 5 illustrate the dough sheet 51 with the backing sheet or layer 52 applied to one side. As illustrated, the dough sheet 51 in this instance is relatively thin compared to the backing sheet 52. FIGS. 5 and 7 illustrate a composite sheet as shown in FIG. 4 being applied to the cavity of a die. The dough sheet 51 is of such dimensions relative to the size of the die cavity that the side margins 53 extend beyond the perimeter of the die cavity. This is illustrated more clearly in FIG. 7. FIGS. 8 and 9 illustrate a filling 54 deposited upon the composite sheet. FIGS. 10 and 11 illustrate a second composite sheet identical to the first positioned across the top of the filling with its side margins directly on top of the side margins of the lower sheet. Upon pressing the side margins together, they are caused to adhere. It will be noted in FIG. 11 that the perimeter of the backing layer 52 for the upper and lower composite sheets have their perimeters in juxtaposition but without extending between the margins of the dough sheet. FIGS. 12 and 13 illustrate the product after removal from the die, with the margins 53 which form the seal for the envelope extending entirely about the product.

Figure 15:
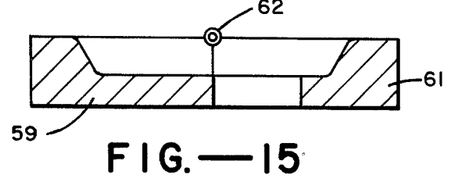
FIG. 15 is a schematic side elevational view in section showing another step in the method for making products.
Figure 16:
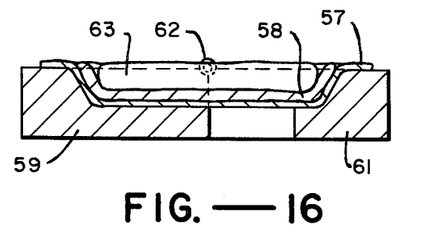
FIG. 16 is a view like FIG. 15 but showing another step in the method.
Figure 17:
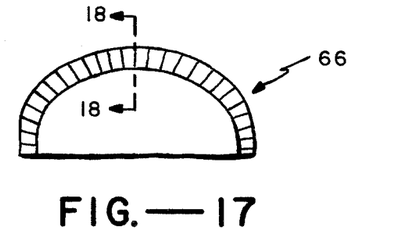
FIG. 17 is a plan view showing a completed turnover product.
Figures 18, 20:
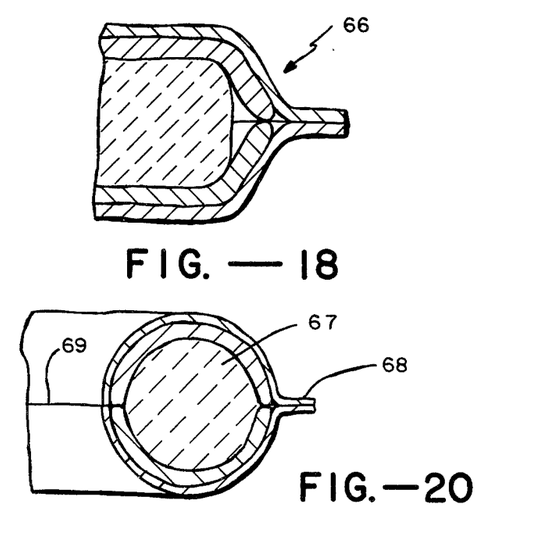
FIG. 18 is an enlarged section taken along the line 18—18 of FIG. 17.
FIG. 20 is a cross-sectional view taken along the line 20—20 of FIG. 19.

FIGS. 14-18 illustrate some of the steps outlined in FIG. 3. Here the composite sheet 56, with its projecting margin 57 and the backing layer 58, has a circular or oval configuration. FIG. 15 illustrates die means of the type disclosed in Zones U.S. Pat. No. 3,230,901, with the composite sheet of FIG. 14 deposited upon the top of the same. The die means in this instance consists of the two parts 59 and 61 secured together by the hinge 62 and carried by conveying means (not shown). FIG. 16 illustrates the filling 63 applied on top of the composite sheet, and particularly within the cavity formed by the die part 59. The next step is for the die part 61 to be swung over and on top of the die part 59, thus folding the composite sheet and bringing projecting margins into overlapping relationship. Finally pressure is applied between the die parts to cause adherence between the overlapping margins. FIGS. 17 and 18 show the completed turnover before cooking. The overlapping margins form an effective seal which encloses the filling in the envelope formed by the folded composite sheet. Substantially no backing layer extends into the region of the seam and the backing layer does not come into direct contact with hot fat during deep fat frying.

Figure 19:
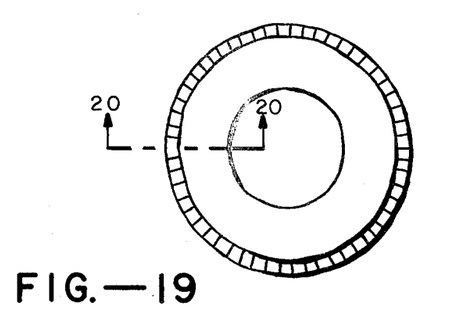
FIG. 19 is a plan view of a doughnut-type product made in accordance with the invention.

As previously mentioned, the method can be used to produce products varying in size and shapes. FIGS. 19 and 20 illustrate a product of the doughnut type. In this instance composite sheets are applied to opposite sides of the ring-shaped filling 67, and the composite sheets are provided with margins extending beyond the backing layer, which are eventually pressed together to form the seal 68 extending about the doughnut form. For the inner circumference of the product it has been found that an overlap seal is not necessary, and therefore here an abutting seal is formed as indicated at 69. In forming this seal, the backing extends to the edge of the dough layer, and the edge faces are brought together in the manner shown in FIG. 20. Therefore in the areas of the doughnut surrounding the central opening, the backing intervenes between the outer dough layer and the filling. During a cooking cycle it has been found that such an abutting type seal does not tend to open to any serious extent, although such a seal for the outer perimeter would open and expose the contents during immersion in the hot cooking oil. While such a product can be cooked by deep fat frying, baking in a conventional oven is preferred. The filling for the doughnut type of product can likewise be unfrozen, or it may be a frozen dessert like ice cream.

With respect to the formulation of the backing material, it should serve as a thermal barrier to minimize transfer of heat through the same, and it should remain relatively intact during and after processing. It should not impair edibility or palatability of the finished product, although it may have flavoring constituents which enhance palatability and flavor. It should be solidified and should remain in such condition during processing. It should lend some rigidity and strength to the composite sheet, thus facilitating use of a dough layer which is relatively thin. The ingredients of the backing should be such that cooking is not required for providing the desired edible properties. A preferred material is a dough formulation similar or comparable to that used for the outer layer, with the sheet of such dough being subjected to a cooking cycle as by baking, after which it is disintegrated to form a powdered or granular material which is then mixed with a sufficient amount of water to form a workable dough. A dough made in this manner has a moisture content (e.g., about 5 to 10%) that is substantially less than the moisture content of a cereal based dough in uncooked form, such as is used for the outer layer, which for a pastry-type dough may be about 20 to 40%. Other cereal or farinaceous formulations can be used such as comminuted precooked breakfast cereal mixed with water and/or fat, or sugar syrup to which a cellulosic filler has been added. Pre-baked cooky crumbs can also be plasticized with water and/or fat to form a dough of paste-like consistency. It is also possible to use any one of several cheeses which can be applied in paste form to the inner side of the dough layer. Good results have also been obtained using chocolate containing stabilizers or fillers, such as cellulosic fiber or milk solids, which has proper plasticity to permit sheeting and which functions in the same manner as the backing materials previously specified (e.g., precooked cereal dough). The fat content of such chocolate based backing material may range from about 25 to 50% and the moisture content about 1.8 to 2%.

With respect to the material used for the filling, if of the frozen dessert type they may be formulations sold under the names of ice cream, imitation ice crean, ice milk dessert, yogurts and custards. In instances where the filling is not of the frozen type, various fillings such as are employed in pies, tarts and turnovers can be used which contain fruit or berries, together with one or more gel-forming agents such as gelatine, pectin, gums and starch. Also the filling may be of the custard or pudding type, a confection like caramel or marshmallow, or a nut paste.

It will be evident from the foregoing that the above described method and products can be used in various ways by commercial establishments. When the filling is of the frozen dessert type, the products may be stored and shipped as frozen products without being subjected to a cooking cycle, such as deep fat frying. Fast-service establishments may subject such a product to a short cooking cycle, as by deep fat frying, immediately before serving to a customer. Likewise, such products can be marketed to the consumer trade with directions for cooking. Instead of storing and marketing in frozen condition before cooking, the products can be cooked as by short time deep fat frying and then stored and shipped in frozen condition for use in fast-service establishments, or to the retail consumer trade. Such a product can be briefly warmed in an oven before serving to enhance palatability, or subjected to micro-wave heating to warm and soften the filling. When the filling is of the unfrozen type, the products can be shipped and stored under refrigeration, either before or after cooking as by deep fat frying. As with the frozen products, products having refrigerated but unfrozen fillings may be cooked by the purchaser as by baking immediately before heating, or if the products have been baked before marketing, they may be warmed for enhancing palatability and flavor. Such flexibility with respect to marketing methods and use of the product is made possible by the relatively thin outer layer which makes possible a relatively short cooking cycle with minimum transfer of heat to the filling.

The backing layer likewise contributes to the versatility of the method and products. During the cooking cycle it serves as a barrier which permits thorough cooking of the surrounding dough layer, the cooking being more effective and thorough because the outer dough layer does not directly contact the inner relatively moist filling. In general, the thermal insulating properties of the inner backing not only minimizes heat transfer to the filling during cooking, but also serves as a thermal blanket to retain the cold condition of the filling. Limiting the backing layer whereby it does not extend to any substantial extent into the regions of the seams makes possible a more effective seam which does not come apart or leak during deep fat frying and which does not promote flaking of portions of the relatively thin dough layer which are pressed together to form the seam. In instances where the basic source material used for the backing layer has a fair amount of moisture, incorporation of a relatively low moisture content stabilizer, such as cellulosic fiber, serves to reduce the overall moisture content to an acceptable level, thus increasing its capabilities in functioning in the manner desired. The relatively low moisture content of the backing layer contributes to its functioning as a thermal barrier between the outer dough layer and the inner filling.

Reference has been made to the backing layer functioning as a barrier to minimize moisture migration. This serves to avoid sogginess of the outer dough layer which otherwise might occur due to migration of moisture from the filling.

Also reference has been made to the use of relatively expensive materials, such as chocolate as an ingredient of the backing layer. Assuming that the chocolate is stabilized as by incorporating a suitable stabilizer like nonfat milk solids or cellulosic fiber, it has been found that the amount of chocolate required when used as a backing layer may be substantially less than the amount that would be used on a product of the same size but applied over the exterior by conventional enrobing methods. However, in any event, the inner layer provides structural strength and support for a thin outer dough layer, thus making possible a dough layer that is relatively thin and which cooks rapidly.

Examples of the invention are as follows:

EXAMPLE 1

The following example is for the manufacture of a product which has a filling of the frozen dessert type.

A conventional pastry dough was prepared with the following composition:

White wheat flour—11 ounces
Shortening—3½ ounces
Salt—3 grams
Water—4 ounces

The above ingredients were mixed together and divided into two dough portions. One portion was sheeted and then baked in an oven at 400° F. for ten minutes. The baked and friable sheet was then crumbled to particles passing through a one-quarter mesh screen. To 6 ounces of the crumbled material there was added 2.5 ounces of shortening, 2 ounces of corn syrup and one ounce of invert sugar syrup. These materials were blended to form a workable dough which was sheeted to a thickness of about ⅛ inch. The other portion of the dough was sheeted to a thickness of about 1/16 inch, and was then sized to form a sheet about 6 inches long and 5 inches wide, weighing about 28 grams, which was suitable for application to a Brooks type turnover die. A dough sheet formed of the pre-baked dough was then applied over the uncooked dough sheet, with the pre-baked sheet being dimensioned to provide a borner or margin measuring about 1 inch in width extending entirely about the composite sheet. The prebaked dough sheet weighed about 32 grams and had a moisture content of about 4.5% compared to a moisture content of 21% for the larger uncooked dough sheet. The composite sheet produced as just explained was then placed over the roller dies of a Brooks turnover machine, with the backing dough faced upwardly and with the margin of the uncooked dough sheet extending over the seam forming portions of the dies. A filling was then deposited upon the backing layer consisting of 1.5 ounces of soft ice cream. The dies were then rotated in opposite directions, according to the operation of the Brooks machine, and this served to develop the filling and bring the projecting margins of the uncooked dough sheet into apposition. Rotation of the dies also served to compress the adjacent margins of the uncooked dough sheet together, thus causing them to adhere. Also it served to trim away excess material from the compressed margins. A product made as just described was immediately fried in hot fat at a temperature of 400° F. for a period of 1 minute. Upon removal from the hot fat, the turnover was placed in a freezer which served to reduce the temperature below 32° F. It was noted that during immersion in the hot fat no part of the filling exuded from the envelope and that the seal remained intact. Some products made in a similar manner were eaten immediately after deep fat frying. Also it was observed that after storage for 30 days in a freezer at a temperature of about 10° F., the product remained edible and was not soggy, thus demonstrating that little migration of moisture occurred through the backing layer.

EXAMPLE 2

The procedure described in Example 1 was repeated using other frozen fillings, namely frozen yogurt, sherbet and frozen custard. In all instances the seal remained intact and there was no flaking of the dough in the regions of the seam or particle diffusion into the frying fat. Also there was no dissolution of a portion of the filling into the hot oil.

It was also found that commercial washes such as are commonly applied to fat-fried and baked products, such as corn syrup and egg-type washes, can be applied to the outer dough layer immediately before and cooking cycle. Such washes are commonly used to modify the surface of fat-fried and baked products, and for flavor enhancement.

EXAMPLE 3

In this example a conventional Brownie-type dough formula was used as follows:
 Margarine—3 tbs.
 Granulated sugar—1 cup
 2 eggs, well beaten—
 Sifted flour—3.5 tbs.
 Hershey Bakers Chocolate, unsweetened—2 ounces
 Finely chopped walnuts—1 cup The above ingredients were processed in a conventional way to produce a workable dough which was spread in baking pans and then baked in an oven at 325° F. for 40 minutes. After cooking, the prebaked material was disintegrated and blended with corn syrup and shortening to form a workable plastic dough. Sheets of unbaked dough were then formulated and prepared as in Example 1, each sheet being about 6 inches long, 5 inches wide and about 1/16 inch thick. Sheets of the prebaked dough were prepared measuring bout 5¼ inch long, 3½ inch wide and ⅛ inch thick. Each sheet of prebaked dough was then applied on top of a sheet of the unbaked dough, leaving a projecting margin of the unbaked dough about ¾ inch wide. Such composite sheets were then used to prepare turnovers in the manner described in Example 1. Frozen desserts used as fillings included ice cream, frozen yoghurt and sherbet. Unfrozen fillings included custards and gelatine, and starch puddings. With respect to the frozen desserts, good products were obtained by deep fat frying both before and after refreezing. The frying time in the hot oil was of the order of 1 minute.

In connection with the above Example 3 it was verified that other conventional cake formulations could be used, as for example, the formulas disclosed in Forkner U.S. Pat. No. 4,020,188, Example 4. Also it was determined that fillings like dairy cheese and nut paste could be used.

EXAMPLE 4

The procedure was the same as described in Example 1 except that the filling was formulated as as follows:
 Peeled subdivided apple slices—1.5 lbs.
 Granulated sugar—5 ounces
 White wheat flour—1 ounce
 Starch—1 ounce
 Water—10 ounces
 Margarine—1 ounce
 Cinnamon—2 grams
 Salt—2 grams The above composition was cooked by boiling and then allowed to cool and partially gel. This pie-type filling was then applied in the manner described in Example 1 and the turnovers subjected to deep fat frying. The product could be eaten immediately after deep fat frying, or if refrigerated or permitted to cool, it could subsequently be warmed in various ways, such as a microwave oven, heat lamps or warming in an oven. During deep fat frying it was observed that the seal remained intact and no part of the filling exuded through the seal to contaminate the fat. The frying time in the fat was of the order of 1 to 2 minutes, in contrast to a frying time of the order of 6 to 9 minutes now being applied to turnovers in commercial establishments. The fast frying time was attributed to the relatively thin outer dough layer which was of the order of 1/16 inch thick.

Thereafter Example 4 was repeated but making use of an outer dough layer about 1/32 inch thick, and a backing layer about ⅛ inch thick. This served to further reduce the frying time. Thus deep fat frying was completed in a period of about 30 seconds using a fat temperature of about 400° F. It was observed in connection with this test, and the test referred to above, that the inner backing layer gave structural strength to the outer dough layer, thus making it possible to use a relatively thin outer layer which cooked to the desired degree of brownness in a short period of time. Also it was observed that the outer dough layer was cooked for its entire thickness, or in other words, during the short time of immersion in the hot fat the entire outer layer up to the area of interface contact with the backing layer was raised to cooking temperature.

EXAMPLE 5

The procedure was substantially the same as described in Example 1. However, the filling in this instance was chicken meat. The chicken meat was cooked by boiling, after which bones and skin were removed and the meat subdivided into pieces of the order of ½ inch. The meat was further cooked by boiling, after adding white cereal flour, starch and salt and pepper seasoning. When cooled to ambient temperature, the liquid content formed a partial gel which served to hold the meat pieces together. After preparing turnovers including this filling, they were fried in deep fat for 1½ minutes with a fat temperature of 380° F. It was observed that the seal between the overlapping margins of the outer dough layer remained intact during frying and no material exuded from the filling to contaminate the fat.

EXAMPLE 6

The product in this instance was circular in form with a seal about its periphery. Two circular composite sheets were formed as in Example 1, the dimensions being such as to permit a margin about ½ inch wide extending beyond the backing layer. Two such composite sheets were placed upon pan-shaped dies, with the perimeter edge of the backing layer being located at the perimeter of the corresponding die cavity. The margins extended beyond the perimeter of the cavities. A filling of the following composition was prepared:

Plain Jello—4.0 ounces
Crushed pineapple—20.0 ounces
Chopped walnuts—6.0 ounces
Marshmallows (miniature)—2.0 ounces
Marshmallow type topping (Birdseye Cool Whip) —4.5 ounces
Water—12.0 ounces The Jello was first added to about 8 ounces with ½ cup of cold water were then added to the boiling water after terminating the heat. This was then cooled and before gelling, the pineapple, topping and chopped nuts were added. Further cooling served to set the gel. Measured quantities of this filling were then added upon each of the composite sheets, and the dies overlaid and compressed together to form a seam. Extra dough was trimmed away from the seal. Some of such products were fried in hot fat immediately after removal from the dies, and in other instances the product was refrigerated and then fried in hot fat. In both instances the frying time was about 1 minute, with the oil at a temperature of about 400° F. Here again it was observed that the seal about the margin of the pie remained intact during deep fat frying, and none of the filling exuded to contaminate the fat. Also it was observed that after deep fat frying, the filling remained intact and retained its gel consistency, with the backing layer inhibiting outward migration of moisture from the filling.

EXAMPLE 7

The procedure was the same as in Example 4 except that the dough was sheeted to a thinness of from 1/64 to 1/32 inch. It was found that this paper-thin dough would receive the backing layer material without breakage, that it would be applied about frozen filling, and that the margins of the dough sheets could be directly pressed together to form a protruding seam. It was found that such a product could be deep fat fried with effective cooking and browning of the dough in a cooking time as short as a few seconds. This minimized melting of the filler and facilitated immediate eating of the product as it was removed from the deep fat frying. In connection with such products it was observed that the thicker backing layer served to structurally support the outer relatively thin dough layer and that the dough remained intact during the cooking cycle, without leakage through the seam and without flaking away of the thin dough in the regions of the seam.

EXAMPLE 8

In this example a backing material was used having a high percentage of hard fat together with a frozen dessert filling, namely ice cream. A composition was prepared consisting of 80% Baker's German chocolate, melted and blended with 20% nonfat dry milk powder. At a temperature of about 100° F. this composition was a plastic mass having working properties analogous to dough and which could be sheeted like dough. A conventional pastry type dough was used and sheeted to about 1/32 inch thick. Measured amounts of this backing material were applied to the dough sheets and sheeted thereon to provide a backing layer about 1/16 inch thick. Compression of the dough layer during such sheeting served to further reduce its thickness to about 1/64 to 1/32 inch. The relative dimensions of the dough and backing layers were such that margins of the dough sheet about ¾ inches wide extended beyond the perimeter of the backing layer. This composite sheet was pliant and was applied to a turnover machine and caused to envelop a mass of soft ice cream filling in the manner described in Example 1. It was observed that shortly after enveloping the frozen filling, the chocolate backing material hardened. However, in such hardened condition it preserved its backing functions, and in addition served as a structural support for the outer dough layer. After chilling to minus 20° F. the products were deep fat fried in oil at a temperature of about 380° F. for periods of about 10 seconds to 1 minute. When eaten while hot the chocolate layer was soft, but after cooling for a short time after removing the products from the hot frying pan, it was found on eating that the chocolate was brittle hard, which was attributed to rapid chilling by contact with the frozen filling. A frying time for such products of from 30 to 40 seconds appeared to be optimum, although 10 seconds gave acceptable products.

It was also found that filling or stabilizing materials other than nonfat dry milk solids could be used with chocolate for forming a backing, as for example, malted milk powder and hard wheat flour of the semolina type.

It was also verified that other types of commercial chocolate could be used in place of Baker's German chocolate.

What is claimed is:

1. An edible food product comprising an edible moist filling disposed within an edible envelope, the envelope comprising an external layer of cereal dough and a protective edible backing layer interposed between the dough layer and the filling, the envelope having a seal formed by overlapping margins of the dough layer, the backing layer being confined to the inner side of the dough layer which is faced toward the filling and forming a thermal barrier.

2. A product as in claim 1 which the outer layer is formed of uncooked cereal dough.

3. A product as in claim 1 in which the outer dough layer has been cooked.

4. A product as in claim 1 in which the outer dough layer is relatively thin compared to the thickness of the inner backing layer.

5. A product as in claim 4 in which the outer dough layer has a thickness of the order of 1/64 to 1/16 inch, the backing layer has a thickness of the order of 1/16 to ⅛ inch, and the filling is a frozen dessert.

6. A product as in claim 1 in which the backing layer is made of material that is substantially unaffected either physically or chemically during a cooking cycle in which the product is immersed in hot oil, the backing serving as a thermal barrier and also serving to minimize moisture migration from the filling to the dough.

7. A product as in claim 5 in which the backing layer has a moisture content substantially less than that of the dough layer.

8. A product as in claim 4 in which the backing layer contains at least about 20% hard fat.

9. A method for the manufacture of edible food products comprising enveloping a mass of filling materials within an envelope, the envelope consisting of an outer layer of uncooked cereal dough and an inner backing layer applied to the inner surface of the dough layer, the backing layer being of material which is edible without cooking and which forms a heat insulating barrier between the dough layer and the filling, and forming at least one overlap seal between margins of the dough layer, the seal being formed by pressing said margins directly in contact with each other, the backing material being confined substantially to the inner surfaces of the dough layer that are within the envelope.

10. In a method for the manufacture of edible products of the type consisting of an inner filling enclosed within an edible envelope, the method comprising forming uncooked cereal dough into a sheet of predetermined dimensions, applying a layer of backing material on one side of the dough sheet, leaving perimeter margins of the dough sheet extending beyond the perimeter of the backing layer, the backing layer being of material capable of serving as a thermal barrier, depositing a mass of filling material on the backing layer, enclosing the filling within the dough sheets with the backing layer interposed between the filling and the layer of dough, and with margins of the dough layer overlapping, and pressing the overlapping margins directly together to form seals for the envelope, the layer of backing material being applied to the dough sheet in such a manner that its perimeter does not extend between the overlapping margins.

11. A method as in claim 10 in which the product after forming seals is subjected to deep fat frying.

12. A method as in claim 10 in which the filling if a frozen dessert.

13. A method as in claim 10 in which the filling is unfrozen as deposited.

14. A method as in claim 10 in which the product is stored under refrigeration and therafter subjected to a cooking cycle.

15. A method as in claim 10 in which the filling is a frozen dessert and in which the product is stored in frozen condition and thereafter cooked by immersion in hot fat.

16. A method as in claim 10 in which the filling is a frozen dessert, and in which the product is cooked by immersion in hot oil, thereafter chilled to freeze the same, stored in frozen condition, and thereafter surface warmed before eating.

* * * * *